United States Patent [19]

Parchet et al.

[11] Patent Number: 4,575,183
[45] Date of Patent: Mar. 11, 1986

[54] MULTI-FIBER OPTICAL CONNECTION ENDPIECE, CONNECTOR USING SUCH AN ENDPIECE AND APPARATUS FOR MOUNTING FIBERS IN THE ENDPIECE

[75] Inventors: Pierre Parchet, Paris; Jean Bouygues, Le Plessis Robinson, both of France

[73] Assignee: SOCAPEX, France

[21] Appl. No.: 545,297

[22] Filed: Oct. 25, 1983

[30] Foreign Application Priority Data

Oct. 26, 1982 [FR] France .................. 82 17916

[51] Int. Cl.⁴ ................................ G02B 7/26
[52] U.S. Cl. ...................... 350/96.22; 350/96.21
[58] Field of Search ............... 350/96.20, 96.21, 96.22

[56] References Cited

U.S. PATENT DOCUMENTS

| | | | |
|---|---|---|---|
| 2,179,197 | 11/1939 | Raymond | 174/66 |
| 3,871,935 | 3/1975 | Gloge et al. | 350/96.21 X |
| 4,079,927 | 3/1978 | Rocton | 269/296 |
| 4,108,534 | 8/1978 | Le Noane et al. | 350/96.21 |
| 4,160,580 | 7/1979 | Le Noane et al. | 350/96.21 |
| 4,214,812 | 7/1980 | De Mendez | 350/96.21 |
| 4,252,407 | 2/1981 | Bubanko et al. | 350/96.21 |
| 4,279,468 | 7/1981 | Turley et al. | 350/96.21 |
| 4,323,300 | 4/1982 | Stewart et al. | 350/96.21 |

FOREIGN PATENT DOCUMENTS 2627042 12/1977 Fed. Rep. of Germany .
2020844 11/1979 United Kingdom .

OTHER PUBLICATIONS

*Electronics Letters,* vol. 17, No. 22, Oct., 1981, Londres (GB) T. Satake et al., "Low-Loss Multifibre Connectors with Plug-Guide-Grooved Silicon," pp. 828-830.

*Primary Examiner*—John Lee
*Attorney, Agent, or Firm*—Pollock, Vande Sande & Priddy

[57] ABSTRACT

The present invention concerns a multi-fiber optical connection endpiece, an optical fiber connector using such an endpiece, as well as an apparatus for mounting fibers in the said endpiece. This connector comprises a reference plane of the connection and two cylindrical measuring rods substantially perpendicular to this plane. Each endpiece comprises an endpiece reference plane of the endpiece bearing on the connection reference plane and two V-shaped channel grooves on its rear face from where issue fibers situated at a precise coordinate with respect to the endpiece reference plane. The endpieces are aligned when the V-shaped grooves abut on either side of the measuring rods.

12 Claims, 13 Drawing Figures

FIG_4-a

FIG_4-b

MULTI-FIBER OPTICAL CONNECTION ENDPIECE, CONNECTOR USING SUCH AN ENDPIECE AND APPARATUS FOR MOUNTING FIBERS IN THE ENDPIECE

BACKGROUND OF THE INVENTION

The present invention concerns a multi-fiber optical connection endpiece, an optical fiber connector using such an endpiece, as well as an apparatus for mounting the fibers in the said endpiece.

DESCRIPTION OF THE PRIOR ART

The utilization of information transmission cables containing a plurality of optical fibers necessitates the interconnection of said fibers, the connections being either definitive in the case of splices or detachable connections using optical fiber connectors. In this latter case, monofiber type connectors in which the alignment realized with the whole of the fibers of the other cable is used. The first technique necessitates the realization of an endpiece by each fiber, each pair of endpieces of the two cables being joined through the use of an alignment sleeve. Such a technique is described, for example, in French patent applications published under Nos. 2 479 483, 2 493535 and 2 493 536. This technique involves necessarily an expensive connection due to the fact of utilizing a plurality of endpieces, alignment sleeves, as well as a plurality of centering and fixation operations of each fiber in its endpiece.

The second method that consists of realizing multiple fibers endpieces is much more economical but until the present time no simple realization of this has ever been proposed. The connection endpiece and the connector utilizing these endpieces such as described in French Pat. No. 2 487 528 are indeed particularly long and delicate to operate. The V-shaped type endpiece realized in this patent necessitates indeed for its mounting the utilization in a mounting apparatus of a measuring rod being placed at the bottom of the V-shaped groove of the centering apparatus, on which rest two liners also bearing on the walls of the V, thus forming a new V in which are placed further measuring rods in contact with each other and between which are placed the fiber to be positioned in the corresponding endpiece, before overmolding of the assembly in the endpiece in a manner known per se. Such a technique is particularly long and delicate to operate, taking into account the large number of intermediary mobile parts necessary for its utilization. In particular, it will be noted that the dimensions of the connector are such that the obtaining of the flat plane on the reference faces of the dihedron of the equipment becomes very difficult. Furthermore, the precision on the dihedral angle is critical especially for positioning the external fibers. Furthermore, the efforts exerted to obtain a good bearing during realignment of the two tips are necessarily considerable due to the dimensions of the connection endpiece.

SUMMARY OF THE INVENTION

The endpiece according to the invention allows these drawbacks to be overcome. It is characterized in that it comprises a body provided, on the one hand, with a plurality of recesses for housing optical fibers issuing onto a front face and, on the other hand, with a reference plane situated on one of its faces allowing to indicate in a precise manner the coordinate (z) of the fibers, and relative means for the alignment of the said fibers in plane (x,y) constituted by two V-shaped grooves realized in the front face of the endpiece, the ridge of each groove being situated in a plane perpendicular to the reference plane, the said ridges being symmetrical with respect to the median plane of the endpiece perpendicular to the reference plane.

Preferably, the ridge will be perpendicular to the reference plane of the endpiece, which is industrially the most simple to realize.

For increased simplicity, a body with a substantially parallelepipedic shape is generally used, the front face of the endpiece being perpendicular to the reference plane. Such a multi-fiber connection endpiece results in a reduced dimension connector due to the maintenance of the fibers at small distance from each other. Furthermore, the operation of such a connector is easy since the bundle of fibers is treated overall.

The optical fiber connector according to the invention generally comprises two multi-fiber endpieces and connection and supporting means of the two endpieces with respect to each other so as to align each fiber of an endpiece with a fiber of the other endpiece. It is characterized on the one hand in that each endpiece is in conformity with the realization hereinabove and, on the other hand, in that the connection and supporting means of the two endpieces comprise, especially, a connection comprising a connection reference plane and two floating cylindrical measuring rods situated in a plane substantially perpendicular to the connection reference plane, means for applying the reference plane of each endpiece on the connection reference plane and means for aplying the endpieces against each other in such a way as to ensure a contact between each plane of a V-shaped groove of an endpiece and the corresponding measuring rod of the connection.

In other terms, a connector according to the invention thus comprises a connection and two endpieces such as described hereinabove. The connection comprises a reference plane on which is positioned each reference plane of each endpiece and two floating cylindrical measuring rods, disposed in a plane substantially perpendicular to the reference plane of the connection. Under the exertion of adequate forces, the connection and alignment are realized.

With respect to the endpieces themselves, their elements that cooperate with the means defined hereinabove are a reference plane on the body of the endpiece that bears on the reference plane of the connection and on the two V-shaped grooves realized preferably perpendicular to the reference plane of the endpieces such as specified hereinabove. The precision necessary for these endpieces is situated at the level of the ridge angle of the V-shaped grooves with respect to the reference plane on the body of each tip.

The machining tolerance on the distance between the axes of the two ridges of the V-shaped grooves in each endpiece is recovered in a preferential embodiment of the invention, by the elastic deformation of the two arms created in the endpiece by the presence of a slot, situated in the median plane of the endpiece, perpendicular to the reference plane. Of course, the presence of this slot resulting in a certain elasticity of the two arms thus formed in the endpiece is only justified to the extent that the precision on the distance between the axes of the ridges of the V-shaped grooves is not sufficient with respect to the precision that is required for centering the fibers. In the opposite case, this slot is not necessary.

The means for applying the reference plane of the endpiece on that of the connection will be constituted, for example, by a spring situated in a groove symmetrical with respect to the median plane of the connection perpendicular to the reference plane or by two springs disposed in two grooves symmetrical with respect to the same median plane, in the case of a split endpiece. It is thus preferable that the axis of these grooves pass substantially through the middle of the recesses housing the floating measuring rods. It is possible to use a split endpiece and a non-split endpiece together each with their system of suitable springs.

The means for applying the endpieces against each other will be, for example, nuts being screwed on the coupling and comprising a spring bearing on the rear face of the endpiece, for example, through the intermediary of a flange.

The present invention also concerns an apparatus for mounting fibers in an endpiece such as defined hereinabove, characterized in that it comprises a reference bearing plane on which rests the endpiece reference plane, calibrated cylindrical measuring rods having their axis in a plane perpendicular to the said plane, at a predetermined distance corresponding to the distance of the ridges of the grooves of the endpiece, means for maintaining at a precise coordinate (z) the fibers issuing from the endpiece, means for applying the reference plane of the endpiece on the reference bearing plane and means for applying the lateral planes of the V-shaped grooves on cylindrical measuring rods.

Preferably, the radius of the calibrated cylindrical measuring rods of the apparatus will be larger than that of the calibrated measuring rods used in the connector defined hereinabove. Similarly, the axis of the said calibrated measuring rods will be generally placed perpendicular to the reference bearing plane. In any case, of course, the angle formed by the axis of these measuring rods in a plane perpendicular to the reference bearing plane with respect to the latter will be equal to the angle formed by the ridge of the V-shaped grooves in a plane perpendicular to the reference plane of the endpiece with respect to the latter at the clearance difference.

The placing of the fibers in the endpiece is carried out by a technique commonly called a "precision transfer", taking reference on the bearing face of the endpiece (reference plane on the body of the endpiece) and on the two V-shaped grooves situated in the rear face of the endpiece. The positioning of the fibers in the overmoulding tooling that allows the fixation of each fiber in its corresponding hole within the endpiece with the use of a polymerizable or hardening resin is obtained either by assembly of the calibrated measuring rods on a reference bearing plane, or by a part comprising V-shaped grooves with a very precise pitch. For further detail as to these techniques, reference can be made, for example, to U.S. Pat. Nos. 4,160,580, 4,108,534, 3,871,935. When placing the two endpieces opposite each other in their connection element in such a way as to constitute the connector according to the invention, the said endpieces are in abutment on the centering measuring rods. Consequently, although it is not necessary at the rear face of each endpiece to be parallel to the ridges of the V-shaped grooves prior to finishing of the said endpieces, this rear face must be brought, during polishing of the fibers and of this rear face, to a precise dimension, parallel to the said ridges and thus perpendicular to the reference plane. However, it will be noted that the longitudinal linear error during the placing opposite each other of two optical fibers is a relatively tolerant factor that can be minimized by the contribution of liquid index adaptor (cf. U.S. Pat. No. 4,160,580 concerning the different possibilities of misalignment of optical fibers, these different possibilities being classed in order of decreasing importance).

BRIEF DESCRIPTION OF THE DRAWINGS

The invention will be further described with reference to the following embodiments, given by way of non-limitative examples, in association with the figures that represent:

FIGS. 1a and 1b are cross-sectional views of a connector according to a first embodiment of the invention;

FIG. 1c is a partial longitudinal cross section of endpiece body 5, shown in FIG. 1a;

FIG. 2a is an enlarged cross-sectional view of a connecting plug of the connector shown in FIG. 1a;

FIG. 2b is a plan view of the same connecting plug shown in FIG. 1a;

FIGS. 3a and 3b are cross-sectional views of a connector according to a second embodiment of the invention;

FIG. 3c is a partial longitudinal cross-sectional view of endpiece body 5, shown in FIG. 3a;

FIG. 4a is a enlarged cross-sectional view of a connection plug of the connector of FIG. 3;

FIG. 4b is a plan view of the same connection plug shown in FIG. 4a;

FIG. 1 represents a connector according to a first embodiment of the invention. This connector essentially consists of a connection represented in cross-section on FIG. 1b, and of two connection plugs comprising essentially an endpiece 8, a screw-nut 6 allowing to fix the plug on body 5 of the connection, and an endpiece flange 11 bearing, on the one hand, on the rear face 80 and endpiece 8 and, on the other hand, through the intermediary of the spring 26, on the internal face 82 of the screw-nut 6, this screw-nut having an opening 83 in which is positioned the optical cable 27 (the endpiece flange is, as its name indicates, bored on its center by an opening allowing also the optical cable 27 to pass). The other plug, connected to the other end of the coupling body 5, is absolutely identical in this example to the plug already described and each element bears the same references.

In the body of the connection 5 (cf. FIG. 1b) is disposed a connection base 1 in which are fixed two calibrated cylindrical measuring rods 2, 3 mounted floating inside adequate recesses 44 and 45, on the one hand, 46 and 47 in the coupling cap 4, on the other hand. The base and the cap are extended to the end of connection body 5, taking into account the fact that this base comprises on its upper part the reference coupling plane 28 on which are positioned the endpiece reference planes 7 as will be shown hereinabove. Cap 4 also comprises a spring 25 substantially located on the vertical plane of symmetry (median plane) of the connection body resulting in a force $F_1$ being applied, on the upper part of each endpiece 8. The purpose of this is to press reference plane 7 of connection endpiece 8 against the reference plane 28 of the connection base 1. This spring 25 is housed in a groove 95 symmetrical with respect to the median plane defined hereinabove as represented on FIGS. 1b and 1c. FIG. 1c is a view of a partial longitudinal cross-section of endpiece body 5. It will be observed that springs 25, fixed in the top of grooves 95 and 96, are curved and provided with a boss 97 at their end in order to exert the required pressure on endpiece 8.

Figure 2A:
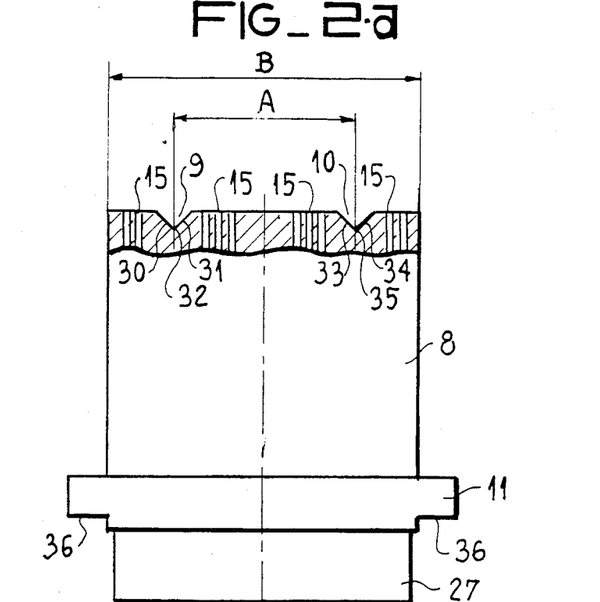
Figure 2B:
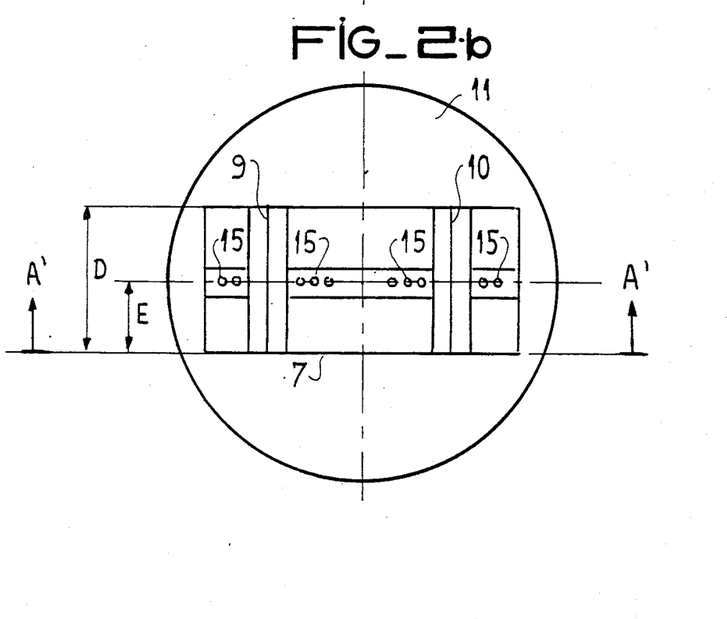

Each connection endpiece 8 comprises on its rear face 29 two V-shaped grooves 9 and 10, the respective faces (30, 31 and 33,34, cf. FIG. 2) of which are pressed against the calibrated floating measuring rods 2 and 3, under the effect of forces $F_2$ exerted by springs 26 during screwing tight (thread 38) of the pin nuts 6 on the connection body 5 through the intermediary of the flanges 11. The purpose of those forces $F_2$ is to press the endpieces 8 against each other and to press each V-shaped groove against the corresponding floating measuring rod, in such a way as to ensure the contact between measuring rod 2 and planes 30 and 31, on the one hand, and planes 33 and 34, on the other hand, for each of the two endpieces 8. An alignment of the fibers 51 in endpieces 8 is thus ensured, each fiber coupled to flanges 11 being aligned with respect to a fiber coupled to the other flanges 11 of the endpiece. During this operation, rear faces 29 of each endpiece come practically into contact with each other, to within clearance difference. It will be noted that on FIG. 1b reference planes 7 and 28, common after alignment, are designated by A'A', the fibers 51 being at a distance z from this plane A'A' (coordinate Z).

FIG. 2 represents schematically an endpiece 8 (not mounted) seen from above and front view. On this figure, the same elements as those of the preceding figures bear the same reference numerals. The rear face of endpiece 29 comprises two V-shaped grooves, 9 and 10. The planes of the dihedrons thus formed, respectively 30, 31, and 33, 34, thus define ridges 32 and 35 of the V-shaped grooves. These ridges must be as strictly perpendicular as possible to reference plane 7 of endpiece 8 (the view represented on FIG. 2a is a view parallel to the reference plane 7). The endpiece, on its rear part, comprises flange 11 through-crossed by optical cable 27, and a circular groove 36 acting as housing recess for spring 26. It is also important during machining of this endpiece, to define with precision dimension A that represents the distance between the two ridges 32 and 35 of the V-shaped grooves 9 and 10. The calibrated holes 15 allowing the passage of optical fibers 51 have their centers indicated in a precise manner with respect to reference plane 7 (or A'A') of endpiece 8, this dimension being indicated by the letter E on the figure. This dimension E will generally be equal to coordinate z of the center of the optical fibers after centering but it can also be slightly different, according to the machining tolerance of the holes 15 (tolerance on dimension E).

Figure 3:
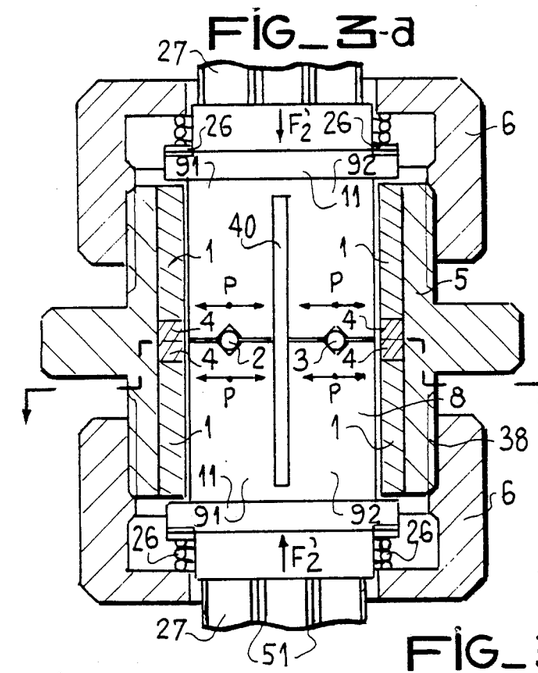

FIG. 3 represents a second embodiment of the connector according to the invention. On this figure, the same elements as those of the preceding figures bear the same reference numerals. Essentially, each endpiece 8 is herein separated into two arms 91, 92. Each arm is separated from the other by a slot 40 giving a certain lateral flexibility (according to arrows P on the figure) to each arm, permitting the exact precision on dimension A between the ridges of grooves 32 and 35 to be relaxed. For example, for an endpiece whose dimension B is 15 mm and height D is 8 mm, the depth C of slot 40 will be comprised between about 10 and 15 mm, the width of this slot being about 2 mm. But this slot width has no influence on the alignment of the fibers with respect to each other.

It will be noted on FIG. 3b that the slot 40 is situated substantially on the vertical median plane of the endpiece 8. The depth C of the slot will be adjusted according to the results required, in function of the materials used. It will be observed, furthermore, on this figure, as on the preceding figures, that the rear face 29 of each endpiece 8 is realized in the present case perpendicular to the endpiece reference plane 7. In order to ensure the perfect bearing of the endpiece reference plane 7 on the reference plane 28 of the connection endpiece 1 two springs 42, 43 are used, situated on either side of the slot, so as to apply independently together, a force $F'_1/2$ on each arm 91, 92 of the endpiece 8. (Forces $F'_2$ are exerted by the same means as those described hereinabove).

The V-shaped grooves being situated substantially in the middle of the front faces of each arm 91, 92 the springs and their grooves will be symmetrically disposed with respect to the perpendicular plane to the reference plane and passing through the ridge of the corresponding groove. In the case where the channels are transported onto the endpiece external sides, the springs would preferably remain substantially in the same disposition as hereinabove.

These springs 42 and 43 are respectively housed in a groove 95, 99 that coincides, on FIG. 3b with upper recesses 46, 47 of the floating measuring rods 2 and 3. FIG. 3c shows the disposition of springs 42 (and 43) in groove 95 (and 99), on either side of floating measuring rod 3. These springs have the same structure as those of FIG. 1 and are applied in 97 on the endpiece 8. Groove 99, symmetrical to groove 95 with respect to the median plane of the connection perpendicular to reference plane 28, has not been represented on FIG. 3c. Of course, one of the endpieces can comprise two arms (and the corresponding part of the coupling is such as represented in FIG. 3c) the other endpiece not comprising a median slot (with a part of the coupling corresponding to a single spring as shown on FIG. 1c).

FIG. 4 represents a view from above parallel to reference plane 7 and a cross-section view of the endpiece according to the embodiment of FIG. 3. On this figure, the same elements as those of the preceding figures bear the same reference numerals. The essential difference with FIG. 2 is the presence herein of slot 40 of depth C, this slot giving a relative flexibility of the two arms 91, 92 and thus allowing a less exact precision on the dimension A between ridges 32 and 35. Each arm 91, 92 is provided with one of the V-shaped grooves 9 and 10. Furthermore, as shown on FIG. 2, the endpiece is represented non-mounted (without fibers) which explains the coordinate E between the centres of holes 15 and reference plane A'A'. Of course, the relative lateral clearance of the V-shaped grooves caused by slot 40 will always be superior or equal to the manufacturing tolerance obtained on the distance A between the axes.

Figure 5:
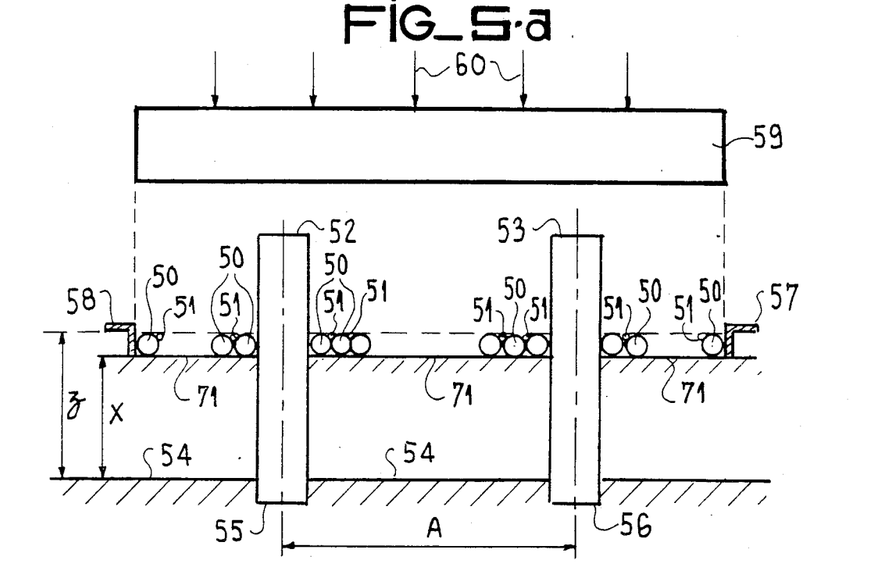
FIGS. 5a, 5b and 5c are schematic views of an apparatus for mounting optical fibers in the endpieces of the connectors according to the invention.

FIG. 5 represents an example of putting into place optical fibers in the endpiece. In order to do this, an apparatus comprising a first apparatus reference plane 54 and a second reference plane 71 situated at a coordinate X relative to the plane 54, is used. Reference planes 54 and 71, parallel to each other are joined by a perpendicular plane 83. In the reference plane 54, at the level of plane 83, are housed two measuring rods 52 and 53 in two respective housing recesses 55 and 56. These calibrated cylindrical measuring rods of radius R, slightly superior to those of calibrated measuring rods 2 and 3 (cf. hereinafter) are disposed in a manner strictly perpendicular to reference plane 54 with a very exact precision dimension A separating their axes 52 and 53. These cylindrical measuring rods 52 and 53, also bear on V-shaped opening grooves 61, 62, 65 and 63, 64, 66, formed in vertical plane 83, with their ridges 65 and 66 also strictly perpendicular to planes 54 and 71. On the reference plane 71 are disposed a plurality of cylindrical measuring rods 50 having a diameter such that the optical fibers 51, bearing between the two jointed cylindrical measuring rods 50, have their axes situated strictly at coordinate z (this technique is well known to the man skilled in the art, cf. the hereinabove cited documents). Measuring rods 50 are laterally maintained by tightening keys 57 and 58. When all the fibers 51 are disposed at the required sites between rods 50, a tightening key 59 is applied on the whole of the fibers, which thus creates a gouged force 60 for aligning exactly all the fibers at coordinate (z). Beforehand, endpiece 8 (FIG. 5c) was positioned so that its reference plane 54 bears on the reference plane of the "precision transfer" equipment, optical fibers 51 issuing from calibrated holes 15 and being positioned between the measuring rods 50. This is carried out by applying a force F"$_1$ on endpiece 8, while a force R"$_2$ is applied behind the endpiece to press the V-shaped grooves 30, 31, 32 and 33, 34, 35 against cylindrical measuring rods 52 and 53. Calibrated measuring rods 52 and 53 have a diameter slightly superior to that of measuring rods 2 and 3, for the following reason: when the fibers issuing from calibrated holes 15 are applied between two cylindrical measuring rods 50 so as to indicate precisely the coordinate z of the said fibers in endpiece 8, and the forces F"$_1$ and F"$_2$ are correctly applied on the said endpiece, the overmolding of the said fibers is realized in a manner known per se, i.e. a polymerisable hardening resin is introduced through an orifice situated above the fiber and communicating with holes 15 (not represented on the figure). When the resin has hardened, the fibers are thus definitively fixed in the endpiece. Forces F"$_1$ and F"$_2$ can thus be suppressed and the endpiece can be removed from the "precision transfer" equipment. Rear face 29 of the endpiece is then subjected to a polishing treatment so as to polish the end of the fibers and bring the rear face of the endpiece exactly perpendicular to reference plane 7. In this way, a part of the rear face of said endpiece (several hundredth of millimeter) is suppressed. Consequently, if measuring rods 52 had the same diameter as measuring rods 2 and 3, it would not be possible to align correctly thereafter the endpiece of one with respect to the other since due to the tolerances, the rear faces 29 of the endpieces would be too remote from each other, thus provoking transmission losses.

Of course, if required, coordinates of the fibers in the endpiece can be variable for each of the fibers, provided that each fiber is marked precisely in each endpiece. In particular, a "precision transfer" apparatus of optical fibers may be used similar to that used in French patent publication No. 2 487 528 with a V-arrangement of the fibers but reference means according to the invention (reference plane and measuring rods).

Similarly, it must be noted that in a manner known per se, the "precision transfer" apparatus can comprise V-shaped grooves instead of the reference plane 71 and calibrated cylindrical measuring rods 50 (cf. U.S. patents cited hereinabove).

Furthermore, it is also possible to replace one or both of the cylindrical measuring rods by a sphere having the same diameter procuring an identical bearing. In particular, this substitution can be advantageous for the mounting equipment, thus suppressing the perpendicularity constraints of the axes of the cylinders. Only the precision on the distance between the axis is therefore important.

Finally, V-shaped grooves 9 and 10 will generally be disposed as close as possible to this lateral external edge of endpiece 8, for an improved alignment precision.

In all the present description, as will be observed, the two endpieces used in the connector according to the invention are identical, which allows them to be used as either a "right" or "left" endpiece. This is one advantage of the instant invention. Of course, this is not necessary and they may be different, if so required.

We claim:

1. A multiple optical fiber connector endpiece, comprising a body provided with a plurality of recesses for housing optical fibers eventuating onto a front face and with a reference plane situated on a second face contiguous to said front face, wherein a distance (Z) between the fibers and said reference plane is indicated in a precise manner, said endpiece further comprising relative means for the alignment of said fibers in an X-Y plane, said relative means including two V-shaped grooves integrated on said front face of said endpiece, ridges of each groove being situated in a plane perpendicular to the reference plane, and said ridges being symmetrical with respect to a median plane of said endpiece perpendicular to the reference plane.

2. A connector endpiece according to claim 1, wherein said ridges of the grooves are perpendicular to the reference plane of the endpiece.

3. A connector endpiece according to claim 1, wherein the body of said endpiece is substantially parallelepipedic, its rear face after mounting of the fibers being perpendicular to said reference plane.

4. A connector endpiece according to claim 1, wherein a slot is situated in the median plane of the endpiece perpendicular to the reference plane.

5. An optical fiber connector comprising two multi-fiber endpieces and connecting and supporting means for positioning two endpieces with respect to each other so as to align each fiber of one of said endpieces with a fiber of the other endpiece, wherein each endpiece is according to claim 1, and said connecting and supporting means fo the endpieces comprising a connection having a connection reference plane and two cylindrical measuring rods mounted floatingly inside housing recesses in a cap of said endpieces and situated in a plane substantially perpendicular to said connection reference plane, means for applying the reference plane of each endpiece on said connection reference plane and means for applying said endpieces against each other in such a way as to ensure a contact between a V-shaped groove of an endpiece and the corresponding measuring rod.

6. A connector according to claim 5, wherein the means for applying the endpiece reference plane on the connection reference plane comprise at least one spring housed in a groove situated in the cap of the connection so as to be symmetrical with respect to the median plane perpendicular to the connection reference plane.

7. A connector according to claim 6, wherein two springs are housed respectively in a groove, the two grooves being symmetrical with respect to said endpiece median plane.

8. A connector according to claim 7, wherein each groove is in the continuation of the housing recess of the corresponding measuring rod of the connection.

9. A connector according to claim 5, wherein the connection contains a base extending substantially along the length of the connection and lying in the connection reference plane.

10. An apparatus for mounting fibers in an endpiece according to claim 1, comprising a bearing reference plane on which rests the reference plane, calibrated cylindrical measuring rods having their axes in a plane perpendicular to said bearing reference plane, positioned at a predetermined distance corresponding to the distance of the ridges of the grooves of said endpiece, means for maintaining at a precise distance from said reference plane the fibers eventuated on said front face of said endpiece, means for applying said reference plane of said endpiece on said bearing reference plane and means for applying the lateral planes of the V-shaped grooves on said cylindrical measuring rods.

11. An apparatus according to claim 10, wherein said calibrated cylindrical measuring rods have their axes perpendicular to said bearing reference plane.

12. An apparatus according to claim 10, wherein the radius of each one of said calibrated cylindrical measuring rods of said apparatus is greater than the radius of each one of said calibrated cylindrical measuring rods used in a connector comprising the endpiece.

* * * * *